2,724,696

TREATMENT OF BENTONITIC CLAYS

George L. Ratcliffe, Los Angeles, Calif., assignor to National Lead Company, New York, N. Y., a corporation of New Jersey No Drawing. Application May 8, 1953,
Serial No. 353,916

13 Claims. (Cl. 252—8.5)

This invention relates to the treatment of bentonitic clays, and more particularly to the beneficiation thereof by chemical treatment to increase the consistency of water slurries made therefrom.

Bentonitic clays are clays composed principally of bentonite, which is a generic term for more or less highly swelling clays made up principally of hydrous aluminum, magnesium and iron silicates. Many separate clay mineral species belong to the bentonite group, principally montmorillonite, hectorite, nontronite and others. A discussion of bentonite and the montmorillonite group of clay minerals generally will be found in Bureau of Mines Technical Paper No. 609, and in U. S. Geological Survey Professional Paper No. 205–B.

Bentonites are rather widespread throughout the world, with the principal commercial occurrences in this country in the Wyoming-South Dakota region, California, Mississippi, and Texas. Bentonitic clays are characterized in particular by a high base-exchange capacity, a term which may be found discussed in detail in the book "Cation Exchange in Soils" by Kelley (N. Y. 1948), as well as in the Geological Survey publication referred to above; and it has been found that in the case of the naturally occurring bentonites, a portion of the total base-exchange capacity is occupied by alkaline earth metal cations, principally calcium and magnesium, and another portion by alkali metal cations, principally sodium but with some potassium generally present. The relative magnitude of these two types, viz., the alkaline earth cations and the alkali metal cations, largely determined the swelling character of the clay when placed in water. The bentonites which are most highly prized commercially, and which find wide usage in oil-well drilling muds, soaps, emulsions, and the like, are of the swelling type in which the alkali metal cations dominate and are for this reason generally referred to as sodium bentonites. The largest known occurrence of bentonites of this type in this country, and indeed in the world, is in the Black Hills region of Wyoming and South Dakota. On the other hand, the Texas bentonites for the most part are dominated by alkaline earth metal cations, principally calcium, and are relatively non-swelling. They are generally called calcium bentonites, or non-swelling bentonites, or even sub-bentonites. They find use as foundry bonding clays and raw material for activated clays used in refining and catalysis. In favorable circumstances they may be at least partially converted to relatively highly swelling bentonites by proper chemical treatment as referred to more in detail hereinbelow. Both the swelling and the non-swelling varieties of bentonite are found in California, as well as hectorite, a highly swelling variety.

As mentioned above, for many important uses of bentonite its swelling property in water is the characteristic which determines the value of a particular bentonite. This is particularly true in the oil-well drilling-mud industry, where bentonites are used in aqueous circulating fluids for use in the rotary drilling method, all as set forth in considerable detail for example in Harth patent No. 1,991,637. Here the relationship between swelling and economic value is quite direct, because more of the lesser-swelling bentonites must be used than of a highly swelling bentonite in order to achieve a given increase in consistency of the mud, and therefore a lesser swelling bentonite can be sold only at a penalty price per ton compared with high-grade swelling bentonites, if indeed at all. Bentonites are evaluated for use in drilling muds principally in terms of the number of barrels of drilling mud of a normal consistency which can be produced by mixing one ton of the bentonite with water. The consistency generally adopted is 15 centipoises as measured in accordance with the specifications of the American Petroleum Institute, Code No. 29; and the barrel used is the oil-field barrel of 42 U. S. gallons. High-grade Black Hills bentonites will range from 90 to 105 barrels per ton on this basis. It has been realized for many years that the calcium bentonites, the non-swelling varieties such as for example occur in Texas, are not in the same class with the so-called sodium bentonites and indeed the former have yields in the range of 25 to 50 barrels per ton, which makes them not competitive with high-grade sodium bentonites. In favorable cases, it has been found possible to treat some calcium bentonites with agents which have the power of removing calcium ion and substituting it with sodium ion, such as, for example, sodium carbonate and sodium oxalate. This is set forth, for example, in German Patent No. 613,037, of 1935.

Within the broad group of sodium bentonites, there exist many which are deficient in swelling properties and yield, in spite of their having a high content of montmorillonite clay mineral, or equivalent, of the sodium type. Large deposits of such low-yield high-sodium bentonites occur in the Black Hills region side by side with deposits of high-yield bentonites. In many cases, one portion of a particular deposit will consist of high-yield bentonite, and another portion will consist of low-yield bentonite. Many attempts have been made to beneficiate the low-yield bentonites of the sodium type, but such attempts have generally been without success. Treatment with sodium carbonate, for example, generally results in either no improvement or such a slight improvement that the treatment is not economical. The practice has been, accordingly, either not to mine such deposits or such portions of deposits, or else to market them for uses where high yield is not a critical factor, such as for example as a foundry bonding clay.

One of the objects of this invention is to provide a process for increasing the yield of bentonitic clays.

Another object of the invention is to provide a method for increasing the yield of bentonitic clays which are of the sodium type and yet are deficient in yield-producing character.

Another object of the invention is to provide a process for the treatment of bentonitic clays to enhance their swelling properties.

Another object of the invention is to provide a bentonitic clay of improved yield properties, particularly for drilling-mud purposes, without affecting adversely the permeability of filter cakes formed from the bentonite.

Another object of the invention is to provide an improved drilling mud comprising bentonite and water.

Other objects of the invention will become apparent as the description thereof proceeds.

In accordance with the invention, a bentonitic clay is treated with permanganate ion preferably in the form of a water-soluble permanganate salt such as sodium permanganate, potassium permanganate, calcium permanganate, ammonium permanganate, and the like. Other compounds which are capable of releasing permanganate ion in aqueous solution are in general also suitable. In general, it suffices to make a simple mechanical mixture of the permanganate salt with the bentonite, such as for example can conveniently be done at the time the bentonite is ground in a roller mill. In such a case, the action of the permanganate on the bentonite is in part delayed until the mixture is contacted with water, whereupon the beneficiation of the bentonite is completed rapidly. However, upon storage, in view of the natural moisture content of bentonite even after commercial drying and grinding, some diffusion of permanganate ion takes place into the particles thereof with a consequent beneficiation of yield. The permanganate salt, particularly when it is soluble in water, may be formed into an aqueous solution which is sprayed onto the bentonite, either in stock piles, after crushing, during a grinding operation, or during a bag-packing operation. The amounts of permanganate salt necessary are so small that the additional water added when this method of application is used is negligible. Again, the bentonite may be prepared in more or less final form for use, as for example by being made into a slurry with water, and the permanganate then added, whereupon beneficiation of the bentonite will take place. All of these methods of application are by way of example, and other methods having as their eventual result the beneficiation of the bentonitic clay by permanganate ion are not excluded from the scope of this invention.

The amounts of permanganate needed for the treatment of ordinary bentonitic clays is small. Generally $\frac{1}{10}\%$ by weight, that is 2 lbs. of a water soluble permanganate salt, per ton of bentonite will give a substantial increase in yield, and even better increases in yield are obtained by using $\frac{2}{10}$ to $\frac{4}{10}\%$ of suitable permanganates. Even more may be added, for example, up to 1% of potassium permanganate, but in general as one exceeds about ½ of 1% the added beneficiation obtained is not justified by the extra cost of treatment.

In general, and as alluded to above, the permanganate treatment as prescribed is most effective on bentonitic clays of the sodium type. It will be understood that practically all naturally occurring bentonites have some sodium and some calcium in the base-exchange locations, so that even a sodium bentonite has some calcium and a so-called calcium bentonite has some sodium as the base exchange cation. It has been found that in many cases, where alkaline earth metal cations make up less than 40% of the total base-exchange capacity of a clay, and alkali metal cations, sodium in the majority, make up the remaining 60% of the base-exchange capacity, then the clay is to be classified as a sodium bentonite. However, as in most naturally occurring substances, the transition is gradual, and calcium bentonites occur all the way up to over 90% of total base exchange capacity. It is scarcely possible to give figures of this type with much exactitude, since the determination of base-exchange capacity on natural clays is still unsettled, and the effect of interfering non-clay constituents such as gypsum is most difficult to overcome in making analyses and computations. As a general rule, however, it is found that the permanganate treatment is most effective on bentonitic clays on which the sodium carbonate or sodium oxalate treatment is not effective, and vice versa; and moreover, that the bentonitic clays amenable to sodium carbonate or sodium oxalate treatment have 40 or 50 or more percent of their base-exchange capacity occupied by alkaline earth metal cations.

A number of examples of permanganate treatment will now be given. The treatments in the following examples were carried out by adding the permanganate or other salt simultaneously with the ground bentonitic clay to suitable quantities of water. After standing for 24 hours, the suspensions were tested with a Stormer Viscosimeter and the yield in barrels per ton determined. The exchangeable bases for the most part were determined for the clays used, and where this was done, the ratio of equivalents of alkaline earth metal cations to alkali metal cations is shown as the cation ratio.

EXAMPLE I

*The effect of treatment on a low yield Wyoming bentonite*

[Cation ratio 29:71]

|  | Control | KMnO$_4$ | |
|---|---|---|---|
| Additive, percent by wt | 0 | 0.20 | 0.40 |
| Yield | 84 | 109 | 118 |

EXAMPLE II

*The effect of treatment on a low yield South Dakota bentonite*

[Cation ratio 25:75]

|  | Control | KMnO$_4$ | | Na$_2$CO$_3$ | | Sodium Oxalate | K$_2$CrO$_4$ | H$_2$O$_2$ | |
|---|---|---|---|---|---|---|---|---|---|
| Additive, percent by wt | 0 | 0.20 | 0.40 | 1.00 | 2.00 | 1.00 | 0.50 | 0.08 | 0.40 |
| Yield | 85 | 111 | 121 | 86 | 89 | 83 | 83 | 85 | 83 |

EXAMPLE III

*The effect of potassium permanganate on a blended average high yield Wyoming bentonite*

[Cation ratio approximately 26:74]

|  | Control | KMnO$_4$ |
|---|---|---|
| Additive, percent by wt | 0 | 0.20 |
| Yield | 107 | 139 |

Example III illustrates a commercially produced clay of originally acceptable yield, which yield has been markedly increased by permanganate.

EXAMPLE IV

*The effect of potassium permanganate on a Wyoming bentonite previously freed from non-clay diluents*

[Cation ratio 26:74]

|  | Control | KMnO$_4$ |
|---|---|---|
| Additive, percent by wt | 0 | 0.316 |
| Yield | 125 | 158 |

In Example IV a bentonite corresponding to that in Example III was first beneficiated by removing the non-clay impurities such as quartz, feldspar, etc. by passing an aqueous suspension, 3% by weight of the clay, thru a super centrifuge. The effluent was dried, ground and tested with and without potassium permanganate added.

EXAMPLE V

*The effect of treatment of a Wyoming calcium bentonite*

[Cation ratio 82:18]

|  | Control | Na$_2$CO$_3$ | | KMnO$_4$ |
|---|---|---|---|---|
| Additive, percent by wt | 0 | 2.0 | 4.0 | 0.20 |
| Yield | 43 | 95 | 110 | 44 |

EXAMPLE VI

*The effect of equivalent additions of sodium, potassium or calcium permanganate on a Wyoming bentonite*

[Cation ratio 29:71]

|  | Control | Permanganates | | |
|---|---|---|---|---|
|  |  | Sodium | Potassium | Calcium |
| Equivalents/100 kg. clay | 0 | 2 | 2 | 2 |
| Additive, percent by wt | 0 | 0.392 | 0.316 | 0.350 |
| Yield | 87 | 125 | 117 | 114 |

The results shown in Examples I and II show how permanganates can be used to increase the yield of a typical sodium type Wyoming bentonite from below the accepted marketable standard for a drilling mud bentonite to considerably above that standard, about 95 to 100 barrels per ton generally being considered the norm. Both of the bentonites for which results are shown in Examples I and II were from the Black Hills region, and both were predominantly sodium bentonites, as will be apparent from the cation ratio given. The inability of other, previously-known treatments, namely, treatment with carbonates and oxalates, to effect any substantial improvement in a bentonite of this type is clearly apparent from Example II.

Even where the yield of the bentonite is fairly high to begin with, where the bentonite is susceptible to treatment by permanganate it may be increased to even larger values. An example of this is shown in Example III, where a bentonite was increased from 107 to 139 barrels per ton.

It is known that most commercial bentonites contain non-clay constituents. These commonly amount to about 10% by total weight in even high-grade commercial bentonites. The removal of these constituents from a bentonite, as for example by centrifuging, will naturally increase the yield more or less in proportion, and that the permanganate treatment may still be effective on such a purified bentonite is shown by the results given in Example IV.

As mentioned hereinbefore, some bentonites are not susceptible to treatment with permanganate, and as far as can be determined at the present time by experimentation, these bentonites are generally of the calcium type, and thus by the same token are generally susceptible to improvement by calcium-removing agents such as sodium carbonate. An example of this is shown in Example V, where a high calcium bentonite, of Wyoming origin, was subjected to treatment with sodium carbonate with a very great increase in yield, while treatment with permanganate failed to give any improvement. Of course, in determining the susceptibility of a given bentonite to treatment with permanganate for the enhancement of yield, it would be possible first to make a determination of exchangeable bases and then predict what the improvement might be, but the direct method of trying permanganate on the bentonite and testing for yield is simple and unequivocal. It should be mentioned that most bentonites commercially sold are routinely tested for yield or an equivalent characteristic from which the swelling properties in water may be judged, and it is about the simplest possible kind of additional experimentation to perform a duplicate test in which permanganate is used. The actual amount of permanganate has not been found to be critical, larger amounts than the optimum generally representing merely an economic waste, so that the bentonite may well be tested with say ½ to 1% of its own weight of sodium or potassium permanganate, and this can be used as a criterion of permanganate improvement susceptibility.

Considerable thought has been given to the possible mechanism involved in the results obtained by the invention, but nothing definite can be stated by way of a theory of action. One thing seems certain, that a simple oxidizing action is apparently not involved. This is shown by results given in Example II, where neither potassium chromate nor hydrogen peroxide was able to effect any increase in yield, on a bentonite which had been found to be quite susceptible to treatment with permanganate.

The amounts of permanganate used, as mentioned, are quite small, so that the cations introduced by permanganate treatment are generally so small in amount that their effect can be disregarded. This is shown by the results given in Example VI, where the increase in yield following the addition of sodium permanganate, potassium permanganate, and calcium permanganate is shown. There is some difference between the three, but it is of a much lesser order of magnitude than the primary increase in yield over the control. Moreover, the slight differences are in line with what is known about the relative flocculating effect upon clays of sodium, potassium and calcium ions, this being the known order of flocculating ability. Thus, any readily available soluble or partially soluble permanganate could be used.

The invention has been described with the use of specific examples, but it is to be understood that the concepts involved are broad, and the description and appended claims are to be interpreted equally broadly.

Having described the invention, I claim:

1. A composition of matter comprising an intimate admixture of a bentonitic clay and a water-soluble permanganate, said permanganate being present in an amount sufficient to increase the yield of said bentonitic clay.

2. A composition of matter comprising an intimate admixture of a bentonitic clay and a water-soluble permanganate, said permanganate consisting of from about 1/10% to about 1% of the weight of said bentonitic clay.

3. A composition of matter comprising an intimate admixture of bentonite and a water-soluble permanganate, said permanganate consisting of from about 1/10% to about 1% of the weight of said bentonite.

4. A composition of matter consisting substantially of a bentonitic clay in intimate adximture with from about 1/10% to about 1% of its weight of a permanganate chosen from the class consisting of sodium, ammonium, potassium, and calcium permanganates.

5. The method of treating a bentonitic clay which consists of contacting said clay in intimate admixture with a modicum of a substance furnishing permanganate ion in an amount sufficient to increase the yield of said clay.

6. The method of treating a bentonite which consists of contacting said bentonite with from about 1/10% to about 1% of its weight of a water-soluble permanganate salt.

7. The method of treating a bentonite which consists of contacting said bentonite with from about 1/10% to about 1% of its weight of a permanganate chosen from the class consisting of sodium, ammonium, potassium, and calcium permanganates.

8. The method of treating bentonitic clay which comprises comminuting said clay in the presence of from about 1/10 of 1% to about 1% of its weight of a water-soluble permanganate salt.

9. The method of treating bentonitic clay which comprises comminuting said clay in the presence of from about 1/10 of 1% to about 1% of its weight of a permanganate chosen from the class consisting of sodium, ammonium, potassium, and calcium permanganates.

10. In the treatment of pulverulent material with water-soluble permanganates, the improvement which consists in contacting a bentonitic clay with sufficient of a water-soluble permanganate to bring about an enhancement of the yield.

11. In the treatment of pulverulent material with water-soluble permanganates, the improvement which consists in contacting a bentonitic clay with from about 1/10% to about 1% of a permanganate chosen from the class consisting of sodium, ammonium, potassium, and calcium permanganates.

12. In the treatment of drilling fluids with chemical additives, the improvement which consists in adding to a drilling fluid comprising water and a bentonitic clay, a water-soluble permanganate in an amount sufficient to increase the yield of said bentonitic clay.

13. A composition comprising a major proportion of bentonite and a minor proportion, sufficient to increase the yield of said bentonite, of a water-soluble permanganate.

References Cited in the file of this patent

UNITED STATES PATENTS

| | | |
|---|---|---|
| 2,393,174 | Larsen | Jan. 15, 1946 |
| 2,417,307 | Larsen | Mar. 11, 1947 |
| 2,551,355 | Weiss | May 1, 1951 |